United States Patent [19]

Ambrose et al.

[11] Patent Number: 4,512,589
[45] Date of Patent: Apr. 23, 1985

[54] OSCILLATING AXLE OVERRIDE SYSTEM

[75] Inventors: Albert R. Ambrose, Troutville; Scott F. Fancett, Roanoke, both of Va.

[73] Assignee: Cooper Industries Inc., Houston, Tex.

[21] Appl. No.: 453,236

[22] Filed: Dec. 27, 1982

[51] Int. Cl.³ .............................................. B60G 19/10
[52] U.S. Cl. ................................ 280/6 R; 180/41; 280/772
[58] Field of Search ............... 180/41; 280/6 R, 6 H, 280/6.1, 6.11, 772, 775

[56] References Cited

U.S. PATENT DOCUMENTS

| 2,219,140 | 10/1940 | Olsen | 267/11 R |
| 2,986,295 | 5/1961 | Shaffer | 280/755 X |
| 3,370,730 | 2/1968 | Fielding | 280/111 X |
| 3,976,302 | 8/1976 | Hammarstrand | 180/41 X |
| 4,093,248 | 6/1978 | Gassner et al. | 180/41 X |
| 4,174,854 | 11/1979 | Spicka | 280/702 |
| 4,264,014 | 4/1981 | Hogg et al. | 280/755 X |

FOREIGN PATENT DOCUMENTS 2710239  9/1978  Fed. Rep. of Germany ..... 280/6 H

Primary Examiner—John A. Pekar
Attorney, Agent, or Firm—Spensley, Horn, Jubas & Lubitz

[57] ABSTRACT

An override system for an articulated vehicle having an oscillating axle suspension. When the angle of articulation exceeds a predetermined maximum while the vehicle is turning, the suspension system is locked to prevent the vehicle from tipping over.

13 Claims, 12 Drawing Figures

OSCILLATING AXLE OVERRIDE SYSTEM

BACKGROUND OF THE INVENTION

1. Field of the Invention

The present invention relates to mining and construction vehicles, and more particularly, to suspension systems for such vehicles.

2. Description of the Prior Act

Heavy duty mining and construction vehicles typically have a suspension system coupling the vehicle frame to the axles, which allows the axles to float or oscillate relative to the frame. In some designs, the suspension system is operative only when the vehicle is being driven to or from a construction or mining site. Once the work site is reached, the suspension system is locked to secure the axles relative to the frame to increase the stability of the vehicle.

A particular type of vehicle for which locking suspensions are useful are cranes which have a high center of gravity. A crane's center of gravity also shifts with the movement of the boom. Accordingly, if the frame of the crane is allowed to move relative to the vehicle axles while the boom is moving, the crane may become unstable and, as a result, the crane may tip over. To avoid this problem, U.S. Pat. No. 4,264,014 suggests a device which unlocks the suspension system only when the boom of the crane is pointed straight forward i.e., the position of the crane when the vehicle is being driven. In that position, the vehicle may be driven with the suspension system operative.

Thus, there have been systems suggested for activating the suspension system when the vehicle is ready to be driven and for locking the suspension system once the crane is put into use at the next site. However, these previous suspension control systems typically do not actively control the suspension while the vehicle is being driven. This is particularly disadvantageous for articulated vehicles which have a front frame pivotally coupled to a separate rear frame. When an articulated vehicle turns, the front frame and rear frame pivot relative to each other, which can sharply reduce the turning radius of vehicle and make it considerably more maneuverable. However, the pivoting of the front and rear frames also shifts the center of gravity of the vehicle. As is more fully explained below, if one or more of the vehicle axles is allowed to oscillate while the vehicle is moving in order to maintain contact between the wheels and the ground over rough terrain, the range of the allowable shift in the center of gravity is reduced. If the center of gravity shifts beyond this allowable range, the vehicle may tip over.

SUMMARY OF THE INVENTION

Accordingly, it is the object of the present invention to provide an improved oscillating axle override system to prevent the vehicle from tipping over while in motion.

It is another object of the present invention to provide an improved suspension control system which is responsive to the degree of articulation of an articulated vehicle.

These and other objects and advantages are achieved in a suspension control system which includes a sensor for sensing a condition of impending imbalance of the vehicle while it is turning. Coupled to the vehicle suspension system is a locking apparatus which, in response to a signal from the sensor, locks the suspension system to prevent the vehicle from tipping over.

In the illustrated embodiment, the sensor senses when the angle of articulation between the frame portions of the vehicle exceeds a predetermined maximum at which the vehicle can turn safely with the suspension system active. Once the predetermined maximum is reached, the suspension system is locked to prevent further pivotal motion of the frame relative to the axle. Hydraulic leveling cylinders may then be utilized to level the frame.

BRIEF DESCRIPTION OF THE DRAWINGS

Like numerals in the various figures refer to like elements.

DETAILED DESCRIPTION OF DRAWINGS

Figure 1:
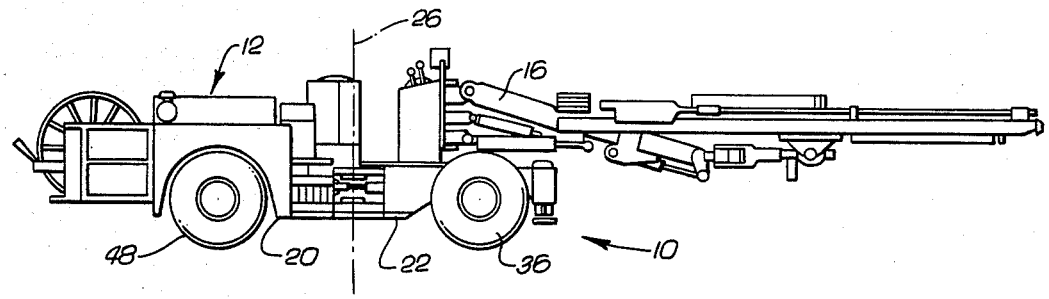
FIG. 1 is a side view of an articulated drill carrier in accordance with a preferred embodiment of the present invention.
Figure 2:
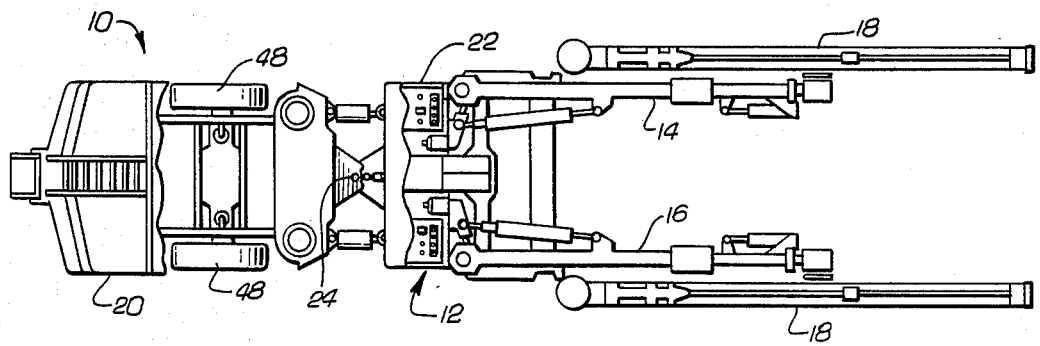
FIG. 2 is a top view of the articulated carrier FIG. 1.

An articulated construction vehicle in accordance with a preferred embodiment of the present invention is indicated generally at 10 in FIGS. 1 and 2. The vehicle 10 includes a mobile carrier 12 upon which is mounted a pair of hydraulic booms 14 and 16. Each of the booms has a drill 18 for underground mining and tunnelling. The carrier 12 is articulated into two sections or frame portions 20 and 22 which are pivotally coupled by a pivot joint 24 (FIG. 2). The pivot center line is indicated at 26 in FIG. 1. The articulation of the carrier 12 significantly increases the maneuverability of the vehicle 10, thereby enabling the drills to be placed in position more rapidly. Although the illustrated embodiment is shown as a drilling rig, the present invention is equally applicable to other heavy duty vehicles.

Figure 3:
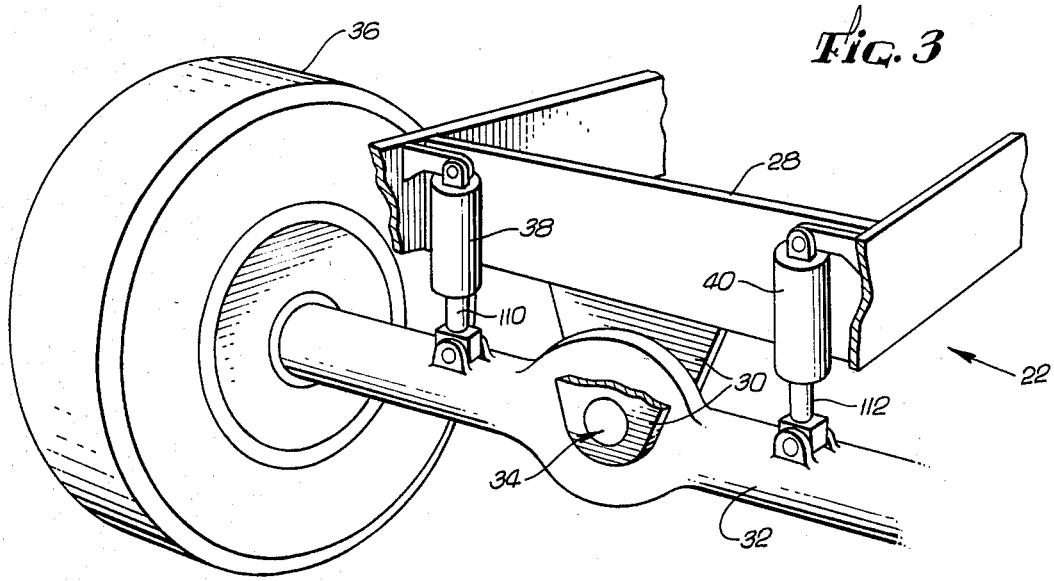
FIG. 3 is a partial pictorial view of the oscillating axle suspension system of the carrier FIG. 1.

The rear frame portion 22 has a pivoting or oscillating axle within an axle housing 32, as shown in FIG. 3. The frame portion 22 has a cross frame member 28 and a central support member 30 which are pivotally coupled to the axle housing 32 as indicated at 34. The rear wheels 36 of the carrier 12 are mounted to the axle housing 32. At opposite ends of the member 28, a pair of hydraulic locking cylinders 38 and 40 are also pivotally coupled to the axle housing 32 and the frame portion 22. As will be more fully understood from the following explanation, the locking cylinders are selectively activated while the vehicle is in motion to prevent the vehicle from tipping over.

Construction vehicles typically have oscillating axles to help maintain contact between the ground and the wheels of the vehicle as the vehicle passes over rough terrain. This has the advantage of allowing each of the wheels to be used for purposes of braking and driving, within the limits of the axle oscillation. An additional advantage of axle oscillation is that it relieves the frame from the torqueing and flexing which would be experienced by a fully rigid frame.

Figure 4:
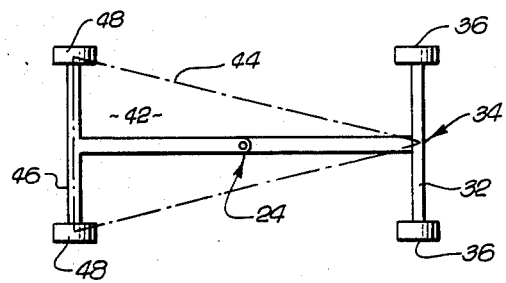
FIGS. 4–7 are schematic representations illustrating the areas of stability for an articulated vehicle.
Figure 5:
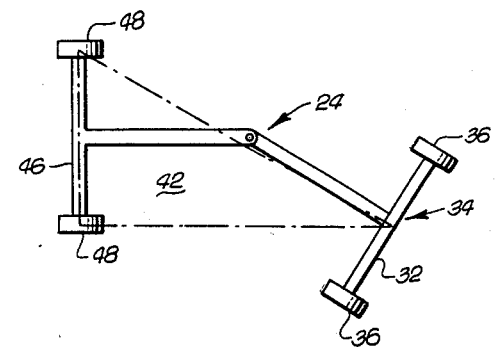

However, allowing the rear axle to oscillate has the effect of reducing the "area of stability" of the carrier 12. This area of stability is schematically represented at 42 in FIG. 4 and is generally triangular in shape. The base of the area 42 coincides with the front axle housing 46 between the front wheels 48 of the front frame portion 20. The apex of the area 42 is formed by the pivot point 34 of the oscillating axle at 32. As long as the vehicle's center of gravity remains within the area 42, the vehicle should remain stable. However, if the vehicle is articulated, the angle between the front and rear portions of the vehicle during a turning maneuver shifts the area 42 to one side, as shown in FIG. 5. If the turning angle is too great, the center of gravity of the vehicle may fall outside the area of stability. As a result, the vehicle can tip over to the angle allowed by the degree of freedom of the oscillating axle. This may occur with enough speed to allow the momentum of the vehicle to continue to tip the vehicle all the way over, especially if the center of gravity is relatively high.

In order to prevent the operation of the vehicle in an unstable condition, in accordance with the present invention, one or more sensors are provided to detect a condition of impending imbalance. In response to such sensors, any oscillatory motion of the axle is overridden and the frame is either locked in place or returned to a level position.

Figure 6:
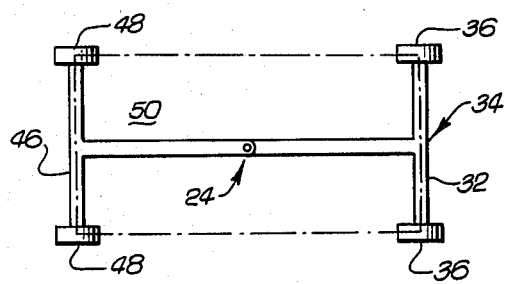
Figure 7:
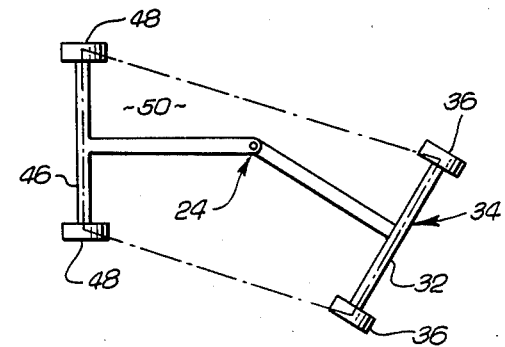

As seen in FIG. 6, with neither axle allowed to oscillate, the area of stability is defined by the four wheels, as indicated at 50. Thus, the vehicle can turn as sharply as represented in FIG. 5 while the center of gravity of the vehicle remains within the area of stability 50, as shown in FIG. 7.

Figure 8:
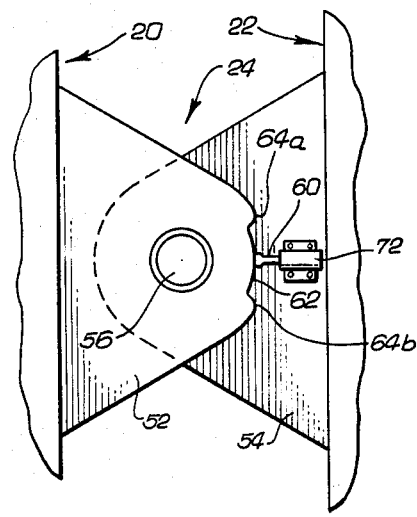
FIG. 8 is a top view of a turning position sensor of the carrier FIG. 1.

FIG. 8 shows an enlarged top view of the pivotal joint 24 between the front and rear frame portion 20 and 22 of the carrier 12. As seen therein, the frame portion 20 and 22 have generally triangular shaped overlapping horizontal extension members 52 and 54, respectively, which are pivotally coupled by a vertical pivot pin 56. Mounted in the center of the extension member 54 is a turning angle sensor 58 which detects when the pivot angle between the articulated sections 20 and 22 reach a predetermined maximum. The sensor 58 has a contact rod 60 which is urged by spring tension against a rounded camming surface 62 at the apex of the extension member 52. The camming surface 62 has a pair of oppositely placed protuberances 64a and 64b which are positioned to engage the contact rod 60 of the sensor 58 when the turning angle reaches the predetermined maximum.

Figure 9:
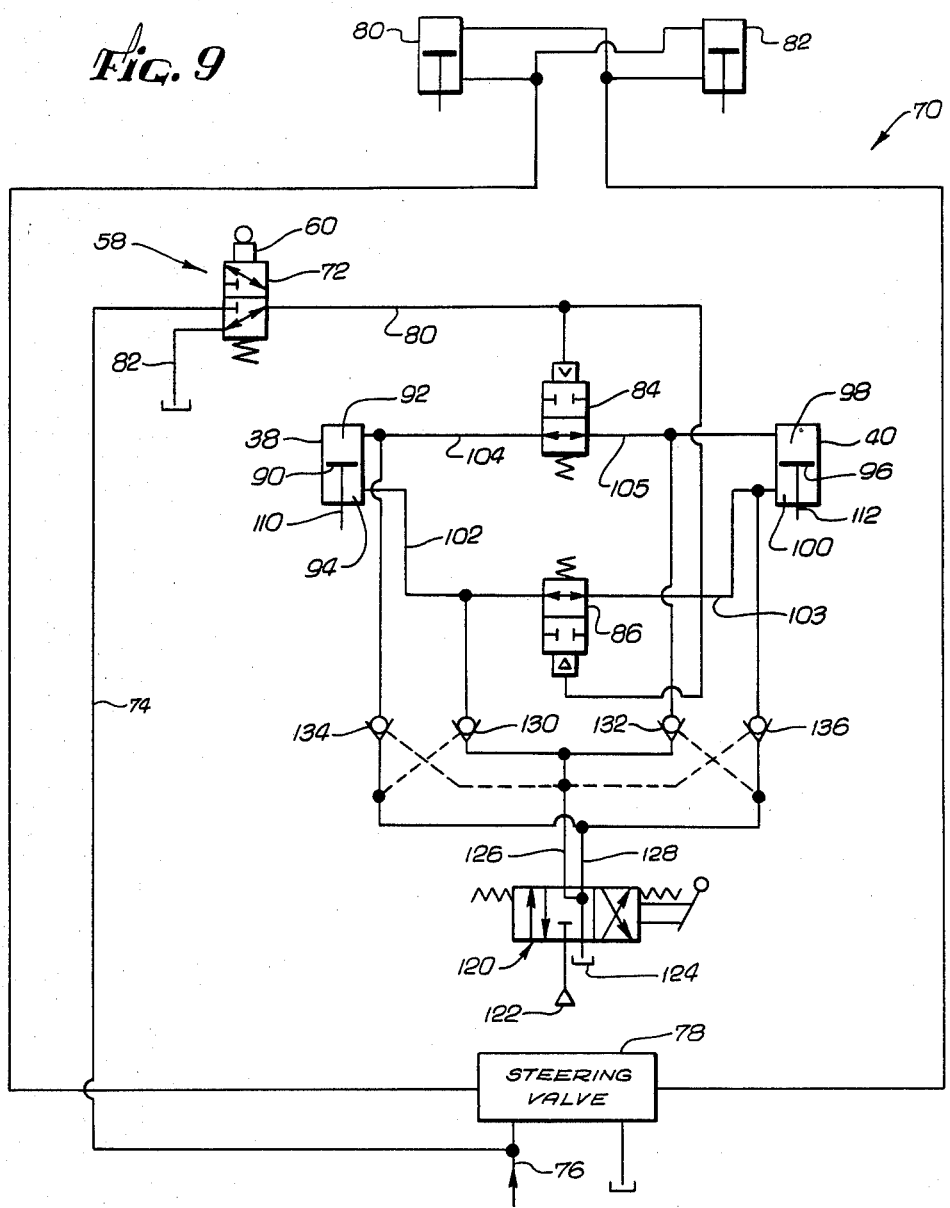
FIG. 9 is a schematic diagram of an override system for the articulated carrier of FIG. 1.

Referring now to FIG. 9, a schematic diagram of an oscillating axle override system in accordance with the present invention is indicated generally at 70. The turning sensor 58 includes a sensor valve 72 which is operated by the movement of the contact rod 60. As previously mentioned, the rod 60 is actuated by the camming surface 62 during a turn. The sensor valve 72 has an inlet coupled by a line 74 to source line 76 of pressurized hydraulic fluid, typically from a hydraulic pump. Normally, the source line 76 supplies pressurized hydraulic fluid to the steering valve 78 which directs hydraulic fluid to a pair of steering cylinders 80 and 82 in accordance with the position of the vehicle steering wheel (not shown) operated by the driver.

The sensor valve 72 also has an outlet line 80 which is normally coupled through the valve 72 to a line 82 which in turn is coupled to the hydraulic reservoir, as shown in FIG. 9. The value 72 is in the position represented in FIG. 9 when the contact rod 60 is in the extended position shown in FIG. 8 and hence, when the turn angle is within the predetermined maximum. However, if the turn angle becomes sufficiently large such that one of the protuberances 64a or 64b of the camming surface 62 engages the contact rod 60, the contact rod 60 is depressed thereby changing the valve 72 position to couple the hydraulic inlet line 74 to the outlet line 80.

The outlet line 80 is coupled to the actuator input of a pair of two-position valves 84 and 86. These valves are normally open allowing free flow between the axle cylinders 38 and 40 coupled between the axle housing 32 and the cross-frame member 28 (FIG. 3) of the oscillating axle. Thus, in this open position, the rear frame portion 22 and the axle housing 32 are free to pivot or oscillate relative to each other. However, when the turning angle between the front and rear frame portions 20 and 22 reaches the predetermined maximum as sensed by the sensor 58, the sensor valve 72 is actuated thereby coupling the pressurized line 74 to the outlet line 80. This in turn causes the two-position valves 84 and 86 to close, thereby uncoupling the fluid lines between the chambers of the cylinders 38 and 40.

The cylinder 38 has a piston 90 which defines upper and lower chambers 92 and 94, respectively, on opposite sides of the piston 90. Similarly, a piston 96 of the cylinder 40 defines a pair of chambers 98 and 100. The lower cylinder chambers 94 and 98 are coupled by hydraulic lines 102 and 103 when the two-position valve 86 is in the open position as shown in FIG. 9. Similarly, the upper cylinder chambers 92 and 100 are coupled together by lines 104 and 105 when the two-position valve 84 is is the open position. As the axle oscillates or pivots about the pivot point 34 (FIG. 3) relative to the rear frame portion 22, hydraulic fluid is forced back and forth between the upper chambers 92 and 98 by the movement of the pistons 90 and 96. In a similar manner, hydraulic fluid is forced back and forth between the lower cylinder chambers 94 and 100.

When the actuation of the sensor valve 72 closes the two-position valves 84 and 86, the axle cylinder chambers are uncoupled from each other which locks the pistons 90 and 96 of the cylinders 38 and 40, respectively, in place. Since the piston rods 110 and 112 of the cylinders 38 and 40, respectively, are coupled to the axle housing 32 as shown in FIG. 3, the frame portion 22 is thereby locked to the axle housing 22 preventing any further oscillatory or pivoting motion. With the oscillating axle so locked, the area of stability is enlarged to include all four wheels as shown in FIG. 7 thereby increasing the stability of the vehicle to prevent it from tipping over.

In order to level the rear frame portion 22, a manual valve 120 is provided which has a pair of ports on one side connected to a hydraulic pump source 122 and a hydraulic reservoir 124, respectively. On the other side, another pair of ports is connected to a pair of hydraulic lines 126 and 128, respectively. The hydraulic source 122 is selectively coupled to either the hydraulic line 126, the line 128, or neither of these lines, depending upon the position of the manual valve 120. Similarly, the reservoir 124 is coupled to either the line 126, the line 128, or neither. The line 126 is connected by a pilot-operated check valve 130 to the hydraulic line 102 which is in turn connected to the lower chamber 94 of the axle cylinder 38, the line 126 is also connected by a check valve 132 to the hydraulic line 105 which is connected to the upper chamber 98 of the cylinder 40. The hydraulic line 128 is, conversely, connected to the upper and lower chambers 92 and 100 of the cylinders 38 and 40, respectively, by a pair of pilot-operated check valves 134 and 136, respectively.

The frame portion 22 can be pivoted in a clockwise direction by manually positioning the valve 120 so as to couple the hydraulic source 122 to the hydraulic line 126 and the hydraulic reservoir 124 to the hydraulic line 128. In this position, hydraulic fluid is supplied through the check valves 130 and 132 to the lower chamber 94 of the left axle cylinder 38 and to the upper chamber 100 of the right axle cylinder 40. The pressure in the line 126 also opens the check valves 134 and 136 which allows hydraulic fluid to flow from the lower chamber 100 of the right axle cylinder 40 and the upper cylinder 92 of the left axle cylinder 38 through the valve 120 to the reservoir 124. In this manner, the piston 90 is raised while the piston 96 is lowered, thereby rotating the frame portion 22 clockwise. Once the frame portion 22 is level, the manual valve 120 is returned to the center position, locking the axle cylinder pistons in position. The check values 130, 132, 134 and 136 prevent the flow of hydraulic fluid from the axle cylinders 38 and 40 to the reservoir 124 when the value 120 is in the center position. The frame portion 22 can be rotated in a counterclockwise direction by manually positioning the valve 120 in the other direction so as to couple the hydraulic source 122 to the hydralic line 128 and the reservoir 124 to the hydraulic line 126.

Figure 10:
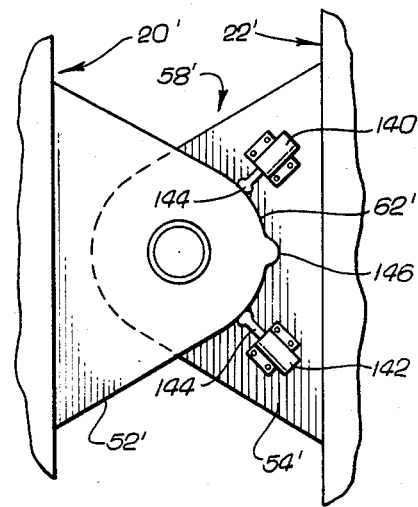
FIG. 10 is an alternative embodiment of the turning position sensor of FIG. 8.

An alternative embodiment of the oscillating axle override system is described in connection with FIGS. 10-12. As shown in FIG. 10, an alternative turning sensor 58' includes a pair of sensor valves 140 and 142, each of which has a contact rod 144. Instead of a pair of protuberances as shown in FIG. 8, the camming surface 62' at the apex of the extension member 52' of the frame portion 20' has a single protuberance 146 in the center of the extension member 52. The sensor valves 140 and 142 are positioned on the extension member 54' of the frame portion 22' such that the protuberance 146 engages the contact rod 144 of either of the sensor valves 140 or 142 when the turning angle has reached the predetermined maximum.

Figure 11:
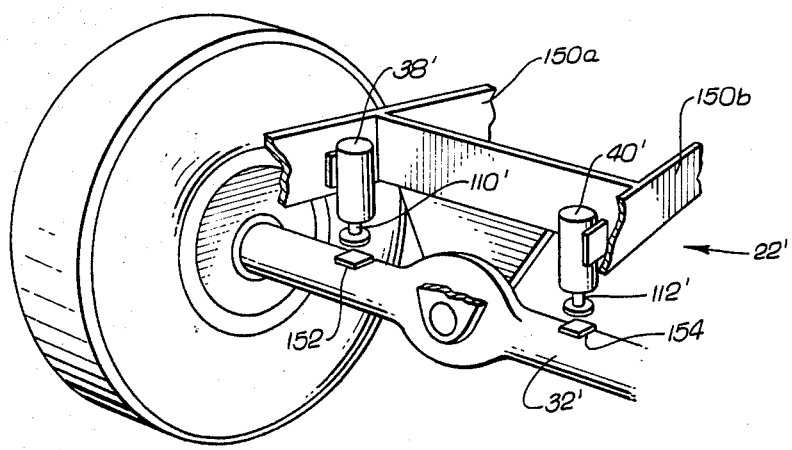
FIG. 11 is an alternative embodiment of the suspension system of FIG. 3.

Referring now to FIG. 11, the frame portion 22' has a pair of axle cylinders 38' and 40' which are coupled to a pair of frame members 150a and 150b of the frame portion 22'. Note that in this embodiment, the cylinders 38' and 40' are not coupled to the axle housing 32' as in the previously described embodiment shown in FIG. 3. Instead, the axle housing 32' has a pair of pads 152 and 154 for engaging the piston rods 110' and 112', respectively, of the axle cylinders 38' and 40', respectively.

Figure 12:
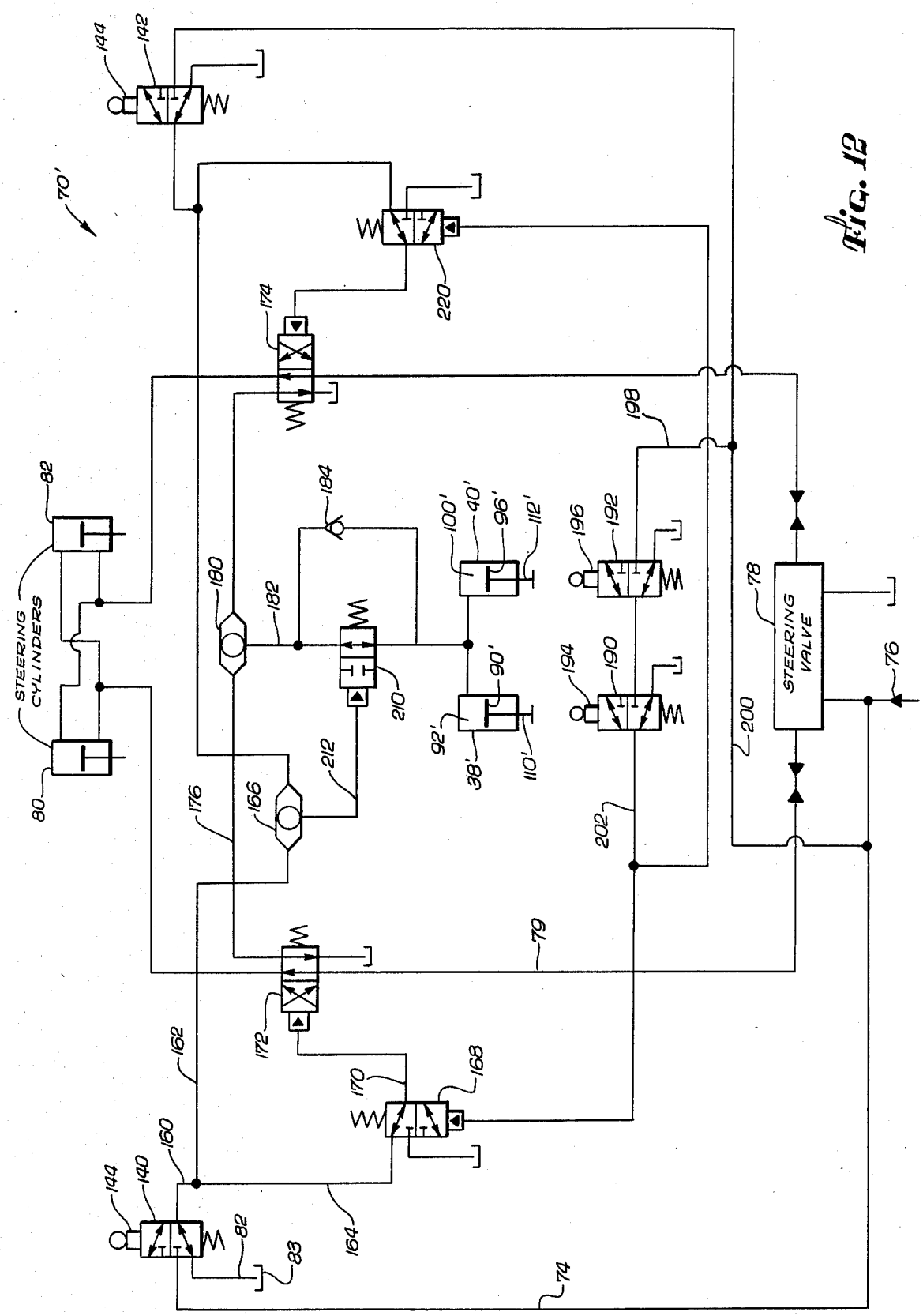
FIG. 12 is an alternative embodiment of the override system of FIG. 9.

A schematic diagram of an oscillating axle override system 70' utilizing the pair of sensor valves 140 and 142 is shown in FIG. 12. As shown therein, the sensor valve 140 has an inlet line 74 connected to a hydraulic pump source line 76, and a line 82 connected to a reservoir 83. An outlet line 160 of the sensor valve 140 is connected by a pair of lines 162 and 164 to a shuttle valve 166 and a three-way valve 168, respectively. The three-way valve 168 is normally open such that the line 164 is coupled through the valve to a line 170. The line 170 in turn is connected to the actuator input of a four-way valve 172. The valve 172 and a second four-way 174 are normally positioned such that the steering valve 78 is coupled through the valves 172 and 174 to the steering cylinders 80 and 82 to allow normal steering, as shown in FIG. 12.

When the turning angle between the frame portions 20' and 22' is such that the protuberance 146 (FIG. 11) engages the contact rod 144 and actuates the sensor valve 140, the inlet line 74 is coupled to the outlet line 160 which, through the open valve 168, actuates the four-way valve 172. This in turn uncouples the steering hydraulic line 79 from the steering cylinders 80 and 82 and couples the line 79 to a line 176. The line 176 is connected through a shuttle valve 180 to an outlet line 182 which is connected by a check valve 184 to the upper chambers 92' and 98' of the axle cylinders 38' and 40'. At the same time that the valve 172 was actuated, the sensor valve 140 also actuated and closed a two-way valve 210 through the shuttle valve 166. Accordingly, hydraulic fluid is diverted from the steering cylinders 80 and 82 thereby locking the steering cylinders such that the vehicle cannot be turned any more sharply. The hydrauli,c fluid is diverted to the axle cylinders 38' and 40' through the shuttle valve 180 and check valve 184. This in turn forces the pistons 90' and 96' downward such that the piston rods 110' and 112' sequentially engage the contact pads 152 and 154 (FIG. 11) thereby levelling the frame portion 22' relative to the axle housing 32'.

Operably coupled to the axle housing contact pads 152 and 154 are a pair of series-connected sensor valves 190 and 192. As the piston rod 110' of the axle cylinder 38' descends and engages the axle housing contact pad 152, the contact rod 194 of the sensor valve 190 is actuated thereby opening the sensor valve 190. In a similar manner, the contact rod 196 of the sensor valve 192 is actuated by the right axle cylinder piston rod 112' to open the sensor valve 192. In this manner, both sensor valves 190 and 192 are opened when the rear frame portion 22' is level with respect to the axle housing 32'.

The sensor valve 192 has an inlet port connected by hydraulic lines 198, 200 and 74 to the hydraulic source line 76. When the rear frame portion 22' is levelled by the cylinders 38' and 40' such that the sensor valves 190 and 192 are both open, pressurized hydraulic fluid is passed to an outlet line 202 which actuates the three-way valve 168. In the actuated position, the valve 168 couples the hydraulic line 170 to the reservoir which releases the four-way valve 172 and allows normal steering to return. As previously mentioned, when the turning angle sensor valve 140 is first activated the two-way valve 210 is actuated which closes the valve 210. Thus, the closed valve 210 and the check valve 180 will prevent the pressure from being immediately released from the axle cylinders 38' and 40' once the four-way valve 172 is returned to its normal position and steering is restored.

Once the vehicle is steered so as to reduce the turning angle, the contact rod 144 is no longer in contact with protrusion 146. This allows the sensor valve 140 to return to its normal position coupling the line 160 to the reservoir. This in turn releases the pressure in the lines 160 and 162 which releases the valve 210. As a result, the axle cylinders 38' and 40' are then coupled to the reservoir through the shuttle valve 180 and the valve 172. This releases the pressure in the cylinders 38' and 40' and the axle is again free to oscillate until the turning angle sensor 140 is again activated.

The right turning sensor valve 142 operates in a similar manner for opposite direction turns to actuate the valve 174 and thereby freeze the steering and activate the axle cylinders 38' and 40'. Also, the series-connected sensor valves 190 and 192 then activate a three-way valve 220 to restore the steering.

It will, of course, be understood that other modifications of the present invention, and its various aspects, will be apparent to those skilled in the art, some being apparent only after study and others being merely matters of routine mechanical design. For example, the oscillating axle override system has been described in connection with one or more valves physically sensing the position of articulation. However, it is recognized that sensors could be provided to activate the override system by measuring the tip angle of the vehicle or otherwise detect a shift in the center of gravity. Other embodiments are also possible with their specific designs dependent upon the particular application. As such, the scope of the invention should not be limited by the particular embodiment herein described but should be defined only by the appended claims and equivalents thereof.

What is claimed is:

1. An articulated vehicle comprising:
    a first frame portion having a first axle and a wheel rotatably carried by the axle for supporting the frame portion, said axle being pivotally coupled about a generally horizontal pivot axis to the first frame portion;
    a second frame portion pivotally coupled to the first frame portion about a generally vertical pivot axis and having a second axle and a second wheel for supporting the second frame portion;
    sensor means for sensing a condition of impending imbalance caused by pivoting between the first and second frame portions about the generally vertical pivot axis while the vehicle is turning; and
    means responsive to the sensor means, for restricting the movement of the first axle relative to the first frame portion when the vehicle is in the condition of impending imbalance, thereby increasing the stability of the operation of the articulated vehicle while turning.

2. The vehicle of claim 1, wherein the sensor means includes a turning angle sensor operably coupled to the first and second frame portions for providing a signal when the angle between the first and second frame portions reaches a predetermined maximum and wherein the means for restricting is responsive to said sensor signal.

3. The vehicle of claim 2, wherein the turning angle sensor includes a camming surface coupled to one frame portion and a contact arm coupled to the second frame portion for engaging the first frame portion camming surface.

4. The vehicle of claim 1, wherein the restricting means includes means for locking the first frame portion relative to the first frame portion axle.

5. The vehicle of claim 1, wherein the restricting means initially restricts movement of the first axle relative to the first frame portion in the direction of imbalance and includes levelling means, responsive to the sensor means, for levelling the first frame portion relative to the first frame portion axle.

6. An axle override system for an articulated vehicle having first and second frame portions pivotally coupled to each other about a generally vertical pivot axis and the first frame portion having an axle pivotally coupled thereto about a generally horizontal axis, the system comprising:
    sensor means for sensing when the angular relationship between the first and second frame portions exceeds a predetermined maximum while the vehicle is turning; and
    locking means, responsive to the sensor means, for locking the first frame portion with respect to the first frame portion axle to prevent pivotal motion of the first frame portion relative to the axle, whereby the stability of the vehicle is improved.

7. The system of claim 6, wherein the locking means includes a pair of hydraulic cylinders operably coupled between the axle and the first frame portion, and further including hydraulic fluid conduit means coupled between the cylinders, for allowing hydraulic fluid to flow between the cylinders in response to pivotal motion of the first frame portion relative to the axle, and valve means for closing off the flow of fluid between the cylinders in response to the sensor means wherein the cylinders are fluidically uncoupled when the predetermined turning angle is exceeded thereby locking the first frame portion relative to the axle.

8. The system of claim 7 wherein each of the cylinders has a piston which defines upper and lower chambers, the system further comprising levelling means for selectively supplying pressurized hydraulic fluid to the upper and lower chambers of the cylinders when fluidically uncoupled to selectively unlock and level the first frame portion relative to the axle while preventing any relative motion between the first frame portion and axle not induced by the levelling means.

9. An oscillating axle override system for an articulated vehicle having first and second frame portions pivotally coupled to each other about a generally vertical pivot axis and a first frame portion having an oscillating axle oscillating about a generally horizontal axis, the system comprising:
    sensor means for sensing when the first and second frame portions have attained a predetermined maximum articulated position; and
    levelling means responsive to the sensor means, for levelling the first frame portion relative to the axle.

10. The system of claim 9 wherein the articulated vehicle has steering means for steering the vehicle and changing the articulated position of the first and second frame portions, the system further comprising means responsive to the sensor means, for locking the steering means to prevent further increases in the articulated position.

11. The system of claim 10 further comprising a second sensor means for sensing when the first body portion is substantially level relative to the axle and the locking means further having means responsive to the second sensor means, for unlocking the steering means when the first body portion is substantially level relative to the axle.

12. The system of claim 9 further comprising releasing means responsive to the sensor means, for releasing the levelling means to allow the axle to oscillate relative to the first frame portion when the articulation position is less than the predetermined maximum.

13. An axle override system for an articulated vehicle having first and second frame portions pivotally coupled to each other about a generally vertical pivot axis and the first frame position having an oscillating axle within an axle housing oscillating with respect to the first frame portion about a generally horizontal axis, the system comprising:
- a pair of hydraulic cylinders each having a cylinder housing and a piston which are coupled to the first frame portion and the first frame portion axle housing, each piston defining a cylinder chamber within the cylinder;
- a first hydraulic valve coupled to the cylinder chambers and having a first position in which the cylinder chambers are fluidically coupled together and a second position in which the cylinder chambers are fluidically uncoupled from each other, and having an actuator input;
- a hydraulic sensor valve having a hydraulic output line operably coupled to the actuator input of the first valve, said sensor valve being actuated when the angle of articulation between the first and second frame portions, reach a predetermined maximum, said first valve being actuated to the second position by the sensor valve to uncouple the cylinder chambers thereby locking the cylinders when the angle of articulation reaches a predetermined maximum.

* * * * *